United States Patent [19]
Hollis

[11] 3,739,279
[45] June 12, 1973

[54] RADIO CAPSULE OSCILLATOR CIRCUIT

[75] Inventor: David L. Hollis, Raleigh, N.C.

[73] Assignee: Corning Glass Works, Corning, N.Y.

[22] Filed: June 30, 1971

[21] Appl. No.: 158,251

[52] U.S. Cl. .................. 325/113, 128/2 P, 331/64, 331/65, 331/117, 331/177 V, 340/195, 340/224
[51] Int. Cl. ............................................ H04b 1/04
[58] Field of Search ............... 128/2 P, 2 R, 2.05 P, 128/2.1 A; 325/113; 331/64, 117, 176, 177 V, 65, 70; 340/195, 224

[56] References Cited

UNITED STATES PATENTS

| | | | |
|---|---|---|---|
| 3,150,328 | 9/1964 | Schrecongost | 331/117 |
| 3,133,537 | 5/1964 | Muth | 178/2 P |
| 3,323,513 | 6/1967 | Gnake | 128/2 P |
| 3,340,866 | 9/1967 | Noller | 128/2 P |

FOREIGN PATENTS OR APPLICATIONS

| | | | |
|---|---|---|---|
| 195,162 | 3/1965 | Sweden | 331/177 V |

OTHER PUBLICATIONS

S. MacKay et al., Pill Telemeters Etc. Electronics Eng. 1/3/58.

*Primary Examiner*—Albert J. Mayer
*Attorney*—Clarence R. Patty, Walter S. Zebrowski and William J. Simmons, Jr.

[57] ABSTRACT

This invention relates to a Colpitts oscillator circuit for a radio capsule of the type adapted to be swallowed by a patient for investigating a condition of the gastrointestinal tract. The circuit includes a transistor as the active element and a parallel resonant LC circuit including the series combination of a variable capacitance diode and first and second capacitors, the capacitance of the second capacitor being the larger of the two in order to provide the minimum amount of positive feedback required to cause stable oscillation. The capacitance of the first capacitor, which is connected between the diode and the transistor emitter, approximates that of the diode at the lowest voltage applied to the diode by a sensor device.

10 Claims, 1 Drawing Figure

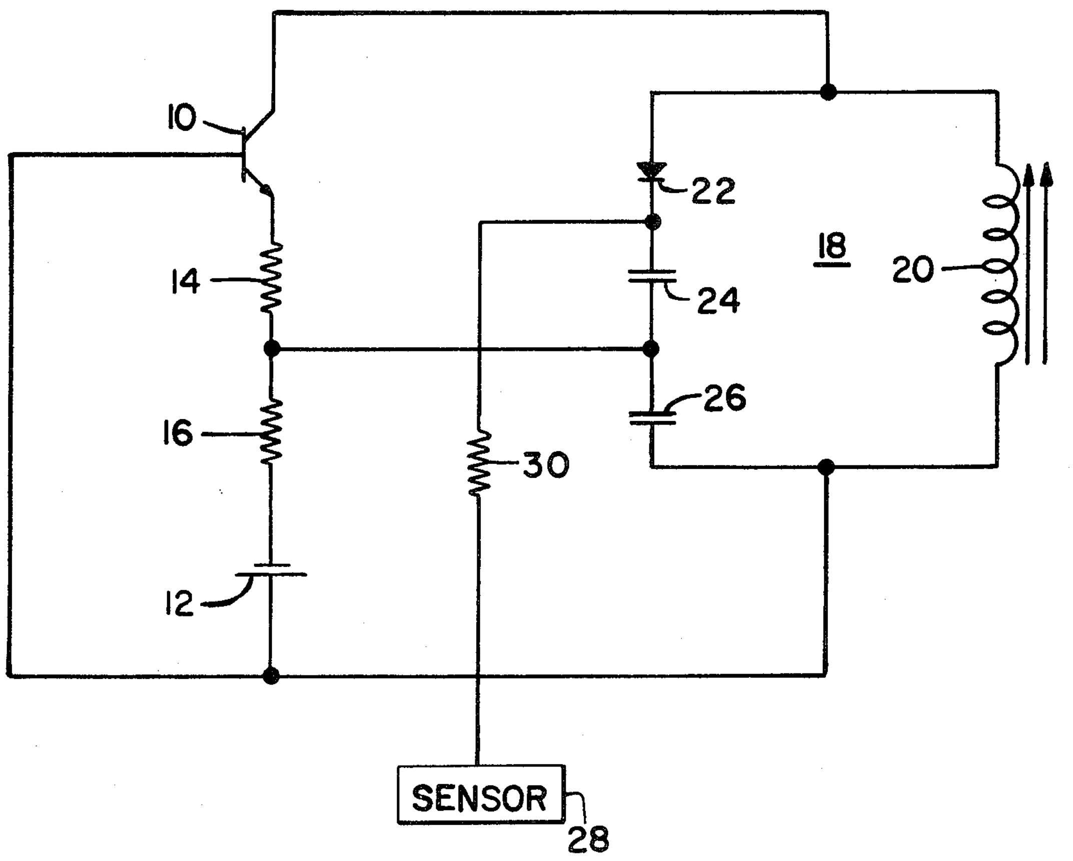
INVENTOR.
David L. Hollis
BY William J. Simmons Jr.
ATTORNEY

RADIO CAPSULE OSCILLATOR CIRCUIT

BACKGROUND OF THE INVENTION

This invention relates to the modulator/transmitter portion of a telemetering system for transmitting physiological information from within the human body, and more particularly to a variable frequency oscillator for use in such a system.

Telemetering systems for transmitting information such as temperature, pressure and specific ion activity such as pH, pK and the like include a radio capsule which can be swallowed by a patient. Conventional radio capsules comprise a sensor or transducer, a power supply and a modulator and transmitter. In the interest of conserving space, the latter two functions are generally combined by utilizing an oscillator, the frequency of which can be varied by the sensor voltage. It is also advantageous to utilize the oscillator inductance as the transmitting antenna.

Due to the nature of the use to which a radio capsule is put, i.e., it is swallowed by a patient and transmits information from within the gastrointestinal tract, some severe design limitations are placed on the oscillator thereof. The number of components must be kept to a minimum due to the small space available, the sensor, battery and transmitter being packaged within a housing having a length of about three-fourths inch and a diameter of about five-sixteenths inch. Inert materials must be used to avoid injury to the human body. Therefore the batteries used in these capsules are generally of the type that provide a low voltage which decreases with usage. Zinc-silver-silver chloride cells activated with a saline solution have been utilized, the silver-silver chloride cell sometimes being also used as the reference electrode for the sensor or transducer.

The oscillator must also present a high impedance input to the transducer or sensor, since excessive sensor current causes the sensor voltage to drift. Since very small sensors must be used in radio capsules, glass ion-sensing electrode structures could not initially be used because the impedance thereof was too high. When well known techniques were applied in the development of ion sensing electrode structures for use in radio capsules, unreliable devices resulted due to size limitations which only permit the use of batteries capable of providing low voltage and power and which provide space for only the simplest of circuits. Such design restrictions resulted in compromises such as the employment of low impedance metal-metal oxide pH sensors to simplify the circuitry problem. For example, U.S. Pat. No. 3,133,537 issued May 19, 1964 to H. Muth and U.S. Pat. No. 3,340,886 issued September 12, 1967 to H. G. Noller disclose low impedance antimony electrodes used in conjunction with a pH measuring radio capsule. Although such electrodes are rugged and provide a low impedance output, they do not provide the accuracy which can be obtained from glass electrode structures and which is required for radio capsule applications.

In an attempt to provide transmitter circuits having input impedances high enough to utilize glass ion-sensing electrode structures, circuits utilizing back-biased transistors or variable capacitance diodes were developed. A circuit utilizing a back-biased transistor as a variable capacitance is disclosed in U.S. Pat. No. 3,323,513 issued to M. Gnadke on June 6, 1967. Although the radio capsule disclosed in this patent achieved some commercial acceptance, the oscillator circuit thereof was not temperature stable. Since the base-collector and base-emitter junction capacitances are about equal, this circuit has too much positive feedback, thereby making the stability problem even worse.

SUMMARY OF THE INVENTION

It is an object of the present invention to provide a radio capsule having an oscillator circuit having good temperature stability and linear frequency versus sensor voltage characteristics. Another object of the present invention is to provide a radio capsule oscillator circuit which draws only a low leakage current from the sensor. Still another object is to provide a radio capsule oscillator circuit having a single coil which functions as the transmitting antenna as well as the inductance of the frequency determining tuned circuit.

Briefly, this invention relates to a radio capsule of the type adapted to be swallowed by a patient for investigating a condition of the gastrointestinal tract. Such capsules comprise a voltage source, a sensor for providing a voltage, the value of which is determined by the investigated condition and an oscillator for generating an *rf* signal, the frequency of which is determined by the sensor voltage. The radio capsule oscillator includes an active element having at least one input terminal and an output terminal, biasing means being provided to connect the voltage source to the active element. An inductor is connected between the active element output terminal and a reference potential terminal. The series combination of a variable capacitance diode, a first capacitor and a second capacitor is connected in parallel with the inductor. First means is provided for connecting the sensor voltage across the diode, and second means is provided for connecting the junction of the first and second capacitors to the active element input terminal. The capacitance of the second capacitor is larger than that of the first capacitor so that a minimum amount of positive feedback is coupled to the active element to provide stable oscillation.

BRIEF DESCRIPTION OF THE DRAWING

The sole FIGURE is a schematic diagram of the radio capsule oscillator circuit of the present invention.

DESCRIPTION OF THE PREFERRED EMBODIMENT

The circuit illustrated in the figure is basically a Colpitts oscillator having a low-capacitance, n-p-n transistor 10 as the active element. The base of transistor 10 is directly connected to the anode of battery 12, whereas the emitter thereof is connected to the cathode of battery 12 by series connected resistors 14 and 16. The battery is preferably of the type disclosed in the aforementioned Noller, Muth and Gnadke patents wherein one electrode thereof is the reference electrode for a sensor electrode as well as being part of the power supply for the oscillator circuit. A resonant circuit 18 comprising an inductor 20 in parallel with the series combination of varicap diode 22 and capacitors 24 and 26 is connected between the collector of transistor 10 and the anode of battery 12.

The oscillator frequency is controlled by variable capacitance diode 22, the capacitance of which is determined by the voltage applied thereto by sensor 28, which may be an ion-sensing electrode structure or other transducer. Although it is useful in conjunction with many types of radio capsule sensors, the circuit of the present invention will be described in conjunction with ion-sensing electrode structures, and in particular with glass pH electrode structures. An electrode structure particularly well suited for use in conjunction with the circuit of the present invention is disclosed in copending application, Ser. No. 158,293 entitled "Glass Electrode Structure For Radio Capsules" filed by D. J. Fischer, H. J. Kunz and T. E. Norby on even date herewith.

Connected between sensor 28 and diode 22 is a resistor 30, the resistance of which is small compared to the impedance of diode 22 and to the dc resistance of the sensor, but it is large enough to prevent capacitance appearing between the sensor and reference electrode, which may be the positive electrode of battery 12, from becoming a part of the frequency-determining circuit. Capacitor 24 isolates diode 22 and sensor 28 from the low impedance emitter circuit of transistor 10, and capacitor 26 determines the amount of positive feedback supplied from resonant circuit 18 to the emitter circuit of transistor 10. Resistor 16 is utilized for biasing purposes and provides an ac impedance between the base and emitter of transistor 10. Resistor 14 provides negative feedback for stabilizing transistor gain during battery voltage degradation. Inductor 20 is provided with an adjustable ferrite core which is adjusted to set the frequency of the circuit before it is encapsulated in the radio capsule housing.

The transmission range of a circuit of the type described is usually about one foot when the capsule is used in conjunction with a broadband, recording-type receiver having a 200 kHz bandwidth. This short transmitting distance is usually adequate since the receiving antenna, which is a small loop antenna, is placed directly on the body of a person who has swallowed a radio capsule. An increased transmission range, however, is desirable since it results in an increased signal-to-noise ratio. The transmission range is proportional to the circulating current in resonant circuit 18, so increasing the Q thereof increases the transmission range. Greater stability also results from a high resonant circuit Q. In view of these considerations, the circuit shown in the figure was initially constructed from capacitors, the values of which provided a high Q and a high frequency shift per pH unit, viz. about 20 kHz/pH. The 20 kHz/pH frequency shift was achieved by using a 1,000 pF capacitor for capacitor 24 and a 2.2 nF capacitor for capacitor 26. It is noted that in this initially constructed circuit, resistor 14 was omitted, and that the value of capacitor 26 was chosen such that the amount of positive feedback was just adequate to provide stable oscillation. Although the frequency shift per pH unit of this circuit was very high, sensor leakage current was too high for sensor voltages below about 0.1 volt, a sensor voltage corresponding to the pH 7 region. This leakage current caused severe polarization of the pH electrode, resulting in drift when the capsule was operating in a pH 7 solution. Moreover, the temperature coefficient of this circuit, about 1.3 kHz/°C., was somewhat higher than desired, and the pH vs. frequency characteristic of the circuit was nonlinear.

Reducing the value of capacitor 24 to a value approximating that of diode 22 at low sensor voltages and using for capacitor 24 one having a negative temperature coefficient reduced leakage current, increased temperature stability and provided a more linear frequency vs. pH characteristic. Reducing the value of capacitor 24 also has the undesirable effects of reducing the frequency shift per pH unit and somewhat reducing stability by reducing the Q of resonant circuit 18. Therefore, the value of capacitor 24 must be as large as possible without causing excessive leakage current at the highest value of pH that the radio capsule is expected to encounter. The effect of capacitors 24 and 26 on each of the circuit characteristics will be hereinafter explained.

Since radio capsules are subjected to various operating temperatures after they have been calibrated, it is necessary that the oscillator circuits thereof be provided with temperature compensation so that the transmitted frequency is an accurate indication of the measured parameter. The most practical technique for providing the circuit of the present invention with temperature compensation characteristics was to reduce the value of capacitor 24 from its initially determined value of 1,000 pF to a value approximately equal to the capacitance of diode 22 at the lowest voltage that the sensor is expected to provide during operation of the radio capsule. Also, capacitor 24 should have a temperature coefficient opposite to that of the diode. By reducing the value of capacitor 24 from 1,000 pF to 220 pF and using a capacitor having a temperature coefficient opposite to that of the diode, the smaller capacitance value provided temperature compensation as well as providing the additional beneficial effects of linearizing the frequency versus sensor voltage characteristics and reducing the sensor current in the pH 7–9 region, as will be hereinafter discussed. A negative temperature coefficient of 1,500 parts per million per degree C. correctly compensated the circuit. However, decreasing the size of capacitor 24 reduced the frequency shift per pH to 12–14 kHz/pH while reducing the temperature coefficient to +200 to −200 hZ/°C. This temperature coefficient is for the circuit alone, no drift due to battery or sensor being considered in the derivation of these circuit characteristics. The temperature coefficient for the circuit alone in terms of pH is 0 to ±0.02 pH per degree C.

Radio capsules should be calibrated at two different sensor voltages near the ends of the range of voltages which are expected to be encountered during use. A pH sensing capsule, for example, is usually calibrated at pH2 and pH7. After calibration, readings of pH2 and pH7 should be fairly accurate, while readings of pH values lower than 2, more than 7 and between 2 and 7 deviate somewhat from the actual pH value, primarily due to two factors. First, the capacitance vs. voltage characteristic of the silicon, variable-capacitance diode 22 is somewhat nonlinear in the region below one volt, wherein lies the output voltage range of the sensor. Secondly, the frequency vs. capacitance characteristic is nonlinear because frequency is inversely proportional to the square root of capacitance. The combination of these two factors results in a frequency vs. sensor voltage curve that has a somewhat greater frequency change for a given voltage change at low sensor voltages, which correspond to a high capacitance, than at higher sensor voltages, which correspond to lower capacitances. Thus, the change in oscillation frequency for a given change in pH decreases as pH decreases.

The capacitance value of capacitor 24 can be chosen to linearize the frequency vs. pH characteristics of the radio capsule. The value of capacitor 24 should be chosen to be about the same capacitance as that of the diode 22 at pH7, the highest pH value expected. The frequency of oscillation is mainly determined by the series combination of diode 22 and capacitor 24, capacitor 26 being relatively large and not contributing much effect. The capacitance of the series combination is $(C_d \times C_{24}) \div (C_d + C_{24})$, where $C_d$ is the capacitance of diode 22 and $C_{24}$ is the capacitance of capacitor 24. As pH increases and the capacitance of diode 22 decreases, its capacitance becomes a more significant part of the series combination. This tends to linearize the frequency versus pH curve. As previously indicated, a high leakage current existed in the initially constructed oscillator circuit in the region below 0.1 volt sensor potential which occurs at pH values of about 7 and above. In the originally constructed circuit, wherein the value of capacitor 24 was 1,000 pF, the sensor began to draw excessive current at 0.1 volt. The reason for this is as follows. Current flows through diode 22 when the instantaneous voltage thereacross exceeds about 0.3–0.35 volts in the forward direction, a condition existing at the positive peak of the rf cycle when the sensor voltage is below about 0.1 volt, when the value of capacitor 24 is 1,000 pF. When the sensor voltage is above 0.1 volts, the voltage across the diode is below the conduction region and current flow therethrough is very low. Reducing the value of capacitor 24 to approximately the capacitance of diode 22 in the 0–0.1 volt region divides the rf voltage which previously had appeared almost entirely across diode 22, so that it now appears equally across diode 22 and capacitor 24. Thus, less rf voltage appears across the diode and the sensor voltage can be lower before the diode begins conducting on rf peaks.

Determining the proper capacitance value and temperature coefficient for capacitor 24 improved temperature stability, reduced sensor leakage current and linearized the circuit pH versus frequency characteristic, but a severe long-term drift was noted when the circuit was incorporated into radio capsules and tested. An investigation revealed that battery potential and the potential of the reference half-cell drifted steadily downward during use, and that the oscillation frequency changed as the battery voltage changed. Sensitivity of the circuit to supply voltage was found to be 28 kHz per 100 millivolts at 0.9 to 1.0 volt. The voltage sensitivity is the result of the low supply voltage and the very low current drain of the circuit. The gain and junction capacitances of transistors vary greatly with small changes in current or voltage when current is low or when the device is operating near cut-off voltage. Both of these conditions existed in the initially designed circuit. To reduce the effect of these changes in current and voltage on frequency, the following changes were made. A transistor having very low junction capacitances was used in the circuit. Also, resistor 14 was added to provide negative feedback to stabilize the transistor gain. Capacitor 26 then had to be reduced from 2.2 nF to 1 nF in order to provide more positive feedback to compensate for the reduced gain so that the circuit would oscillate. These changes caused a reduction in battery voltage sensitivity to 3–8 kHz per 100 millivolts.

Excellent results are achieved when the components arranged in the manner illustrated in the figure have the following values:

| | |
|---|---|
| transistor 10 | D26G-1 |
| diode 22 | IN5456 |
| resistor 14 | 1000 ohm |
| resistor 16 | 6.8 kilohm |
| resistor 30 | 150 kilohm |
| capacitor 24 | 220 pF, −1500 ppm/°C. temperature compensating capacitor |
| capacitor 26 | 1000 pF |

I claim:

1. In a radio capsule adapted to be swallowed by a patient for investigating a condition of the gastrointestinal tract, said capsule being of the type comprising:
   a voltage source,
   a sensor for providing a voltage, the value of which is determined by said investigated condition, and
   an oscillator for generating an rf signal, the frequency of which is determined by said sensor voltage,
   said oscillator being characterized in that it comprises
   an active element having at least one input terminal and an output terminal,
   biasing means connecting said voltage source to said active element,
   a reference potential terminal,
   an inductor having a first terminal connected to said active element output terminal and a second terminal connected to said reference potential terminal,
   the series combination of a variable capacitance diode, a first capacitor and a second capacitor connected in the order named in parallel with said inductor, the capacitance of said second capacitor being larger than that of said first capacitor, said diode being connected to said first terminal of said inductor,
   first means connecting said sensor to the junction between said first capacitor and said diode, and
   second means connecting the junction between said first and second capacitors to said active element input terminal.

2. A radio capsule in accordance with claim 1 wherein the capacitance of said first capacitor is about equal to that of said diode at the lowest voltage provided by said sensor.

3. A radio capsule in accordance with claim 2 wherein said second connecting means is a resistor.

4. A radio capsule in accordance with claim 3 wherein said first connecting means is a resistor, the resistance of which is small compared to both the impedance of said diode and the impedance of said sensor.

5. A radio capsule in accordance with claim 4 wherein said active element is a transistor having emitter, base and collector electrodes, said collector electrode constituting said output terminal and said emitter electrode constituting said input terminal, the base of said transistor being connected to said reference potential terminal.

6. In a radio capsule adapted to be swallowed by a patient for investigating a condition of the gastrointestinal tract, said capsule being of the type comprising:
   a voltage source,
   a sensor for providing a voltage, the value of which is determined by said investigated condition, and
   an oscillator for generating an rf signal, the frequency of which is determined by said sensor voltage,
   said oscillator being characterized in that it comprises a transistor having base collector and emitter electrodes, biasing means connecting said voltage source to said emitter electrode, a reference potential terminal, said base electrode and a terminal of said voltage source being connected to said reference potential terminal, an inductor connected between said collector electrode and said reference potential terminal, the series combination of a variable capacitance diode, a first capacitor and a second capacitor connected in the order named in parallel with said inductor, the capacitance of said second capacitor being much larger than that of said first capacitor, the junction between said first and second capacitors being connected to said biasing means, said diode being connected to said collector electrode, and means connecting said sensor to the junction between said first capacitor and said diode.

7. A radio capsule in accordance with claim 6 wherein said biasing means comprises first and second resistors connected in series between said emitter electrode and said voltage source, the junction between said first and second resistors being directly connected to the junction between said first and second capacitors.

8. A radio capsule in accordance with claim 7 wherein the capacitance of said first capacitor is about equal to that of said diode at the lowest sensor voltage.

9. In a radio capsule adapted to be swallowed by a patient for investigating a condition of the gastrointestinal tract, said capsule being of the type comprising:

a voltage source, a sensor for providing a voltage, the value of which is determined by said investigated condition, and an oscillator for generating an rf signal, the frequency of which is determined by sensor voltage, said oscillator being characterized in that it comprises a transistor having base, collector and emitter electrodes, first and second resistors connected between said emitter electrode and the first terminal of said voltage source, the second terminal of said source being connected to said base electrode, an inductor connected between said collector electrode and the second terminal of said source, the series combination of a variable capacitance diode, a first capacitor and a second capacitor connected in the order named in parallel with said inductor, the capacitance of said second capacitor being larger than that of said first capacitor, one terminal of said diode being connected to said collector electrode, the junction between said capacitors being connected to the junction between said first and second resistors, and means connecting said sensor to the junction between said first capacitor and said diode.

10. A radio capsule in accordance with claim 9 wherein a capacitance of said first capacitor approximates that of said diode at the lowest sensor voltage.

* * * * *